(12) United States Patent
Ueda

(10) Patent No.: US 8,996,444 B2
(45) Date of Patent: Mar. 31, 2015

(54) DEVICE, METHOD, AND PROGRAM FOR SELECTING OS IMAGE

(75) Inventor: Yohei Ueda, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 735 days.

(21) Appl. No.: 13/233,084

(22) Filed: Sep. 15, 2011

(65) Prior Publication Data
US 2012/0072388 A1 Mar. 22, 2012

(30) Foreign Application Priority Data
Sep. 22, 2010 (JP) ................. 2010-211812

(51) Int. Cl.
*G06F 9/44* (2006.01)
*G06N 7/02* (2006.01)
*G06N 7/06* (2006.01)
*G06F 9/445* (2006.01)

(52) U.S. Cl.
CPC ...................... *G06F 8/63* (2013.01)
USPC .......................................................... 706/52

(58) Field of Classification Search
None
See application file for complete search history.

(56) References Cited

U.S. PATENT DOCUMENTS

| 7,447,854 | B1 | 11/2008 | Cannon | |
|---|---|---|---|---|
| 7,653,794 | B2 | 1/2010 | Michael et al. | |
| 2002/0073201 | A1* | 6/2002 | French et al. | 709/227 |
| 2007/0006218 | A1* | 1/2007 | Vinberg et al. | 717/174 |
| 2008/0201414 | A1 | 8/2008 | Amir Husain et al. | |
| 2008/0229022 | A1* | 9/2008 | Guthrie et al. | 711/125 |
| 2009/0276771 | A1 | 11/2009 | Nickolov et al. | |
| 2009/0282404 | A1* | 11/2009 | Khandekar et al. | 718/1 |
| 2010/0077066 | A1 | 3/2010 | Chawla et al. | |

OTHER PUBLICATIONS

Bjerke, et al., "Tools and Techniques for Managing Virtual Machine Images," Euro-Par 2008 Workshops—Parallel Processing, 2009, pp. 1-10.
Clark. et al., "Live Migration of Virtual Machines," Proceeding NSDI'05 Proc. of the 2nd conf. on Symposium on Networked Sys. Design & Implementation—vol. 2, 2005, pp. 1-14.
VMWare, Inc., "Guide to Profile Virtualization—VMware Virtualization Software," 2007, pp. 1-10.
Sweemer, "Eating the Dog Food . . . ," Jan. 2009, http://www.virtualinsanity.com/index.php/2009/01/.
Lagar-Cavilia, et al., "Snow Flock: Rapid Virtual Machine Cloning for Cloud Computing," EuroSys'09, Apr. 1-3, 2009, pp. 1-12.
Rolfe, "An Alternative Dynamic Programming Solution for the 0/1 Knapsack", ACM SIGC SE Bulletin, vol. 39, Issue 4, Dec. 2007, pp. 54-56, Sec. 3.

* cited by examiner

*Primary Examiner* — Kakali Chaki
*Assistant Examiner* — Luis Sitiriche
(74) *Attorney, Agent, or Firm* — Jeff Tang

(57) ABSTRACT

A computer-implemented method, selection program, device and article of manufacture for selecting images of one or more operating systems (OS) that are cached in a target data processing system. The method can be implemented in a provisioning system where the system includes a first pool having the images of a plurality of different OS and a second pool having a plurality of data processing systems. The method includes: calculating the probability that the respective OS images in the first pool will be used in the next provisioning; and determining a combination of one or more OS images as one or more OS images to be cached.

8 Claims, 8 Drawing Sheets

DEVICE, METHOD, AND PROGRAM FOR SELECTING OS IMAGE

CROSS-REFERENCE TO RELATED APPLICATIONS

This application claims priority under 35 U.S.C. §119 to Japanese Patent Application No. 2010-211812 filed Sep. 22, 2010, the entire contents of which are incorporated by reference herein.

BACKGROUND OF THE INVENTION

1. Field of the Invention

The present invention generally relates to a technique of selecting an image of an operating system (OS) to be cached in advance in a data processing system used for provisioning.

2. Description of the Related Art

In the related art, clone installation is known as a method for realizing fast provisioning. According to this method, a plurality of types of disk images of computers in which predetermined operating systems (OS)/applications are installed in advance is prepared on a repository server, and a required disk image is selected from the repository server during provisioning and copied to a provisioned computer.

However, transmission of a complete disk image through a network requires a lot of time. Moreover, when numerous resource requests are processed at the same time, a bottleneck may occur in the repository server, and the processing may be delayed.

US Patent Application Publication No. 2008/0201414 (hereinafter "Amir Husain") discloses a technique of accelerating the processing by transmitting only differential data of the image file of a virtual machine when virtual machines are transmitted between a server and a client.

SUMMARY OF THE INVENTION

According to an aspect of the present invention, a computer-implemented method in a provisioning system is provided for selecting one or more operating systems (OS) images to be cached in a target data processing system. The provisioning system includes a first pool having the images of a plurality of different OS and a second pool having a plurality of data processing systems. The target data processing system is one of a plurality of data processing systems from the plurality of OS images in the first pool. The method includes: calculating the probability that the respective OS images in the first pool will be used in the next provisioning; and determining, among all combinations of one or more OS images that can be selected from the plurality of OS images in the first pool to be cached in the target data processing system, a combination of one or more OS images as one or more OS images to be cached, which minimizes an expected value of the time needed for transmitting OS images to the target data processing system in the next provisioning, obtained assuming the caching According to another aspect of the present invention, a selection program is provided that causes a computer to execute the steps of the computer-implemented method.

According to a further aspect of the present invention, a computer-implemented device is provided for selecting images of one or more OS that are cached in a target data processing system in a second pool. The second pool includes a plurality of data processing systems from a first pool. The first pool includes the images of a plurality of different OS. The device includes: a probability calculation unit that calculates the probability that the respective OS images in the first pool will be used in the next provisioning; and a combination determination unit that determines, among all combinations of one or more OS images that can be selected from the first pool to be cached in the target data processing system, a combination of one or more OS images as one or more OS images to be cached in the target data processing system, which minimizes an expected value of the time needed for transmitting OS images to the target data processing system in the next provisioning, obtained assuming the caching of the combination of OS images.

According to still another aspect of the present invention, an article of manufacture tangibly embodying computer readable instructions, which when implemented, causes a computer system to carry out the steps of the method of the present invention.

DETAILED DESCRIPTION OF THE PREFERRED EMBODIMENTS

Figure 1A:
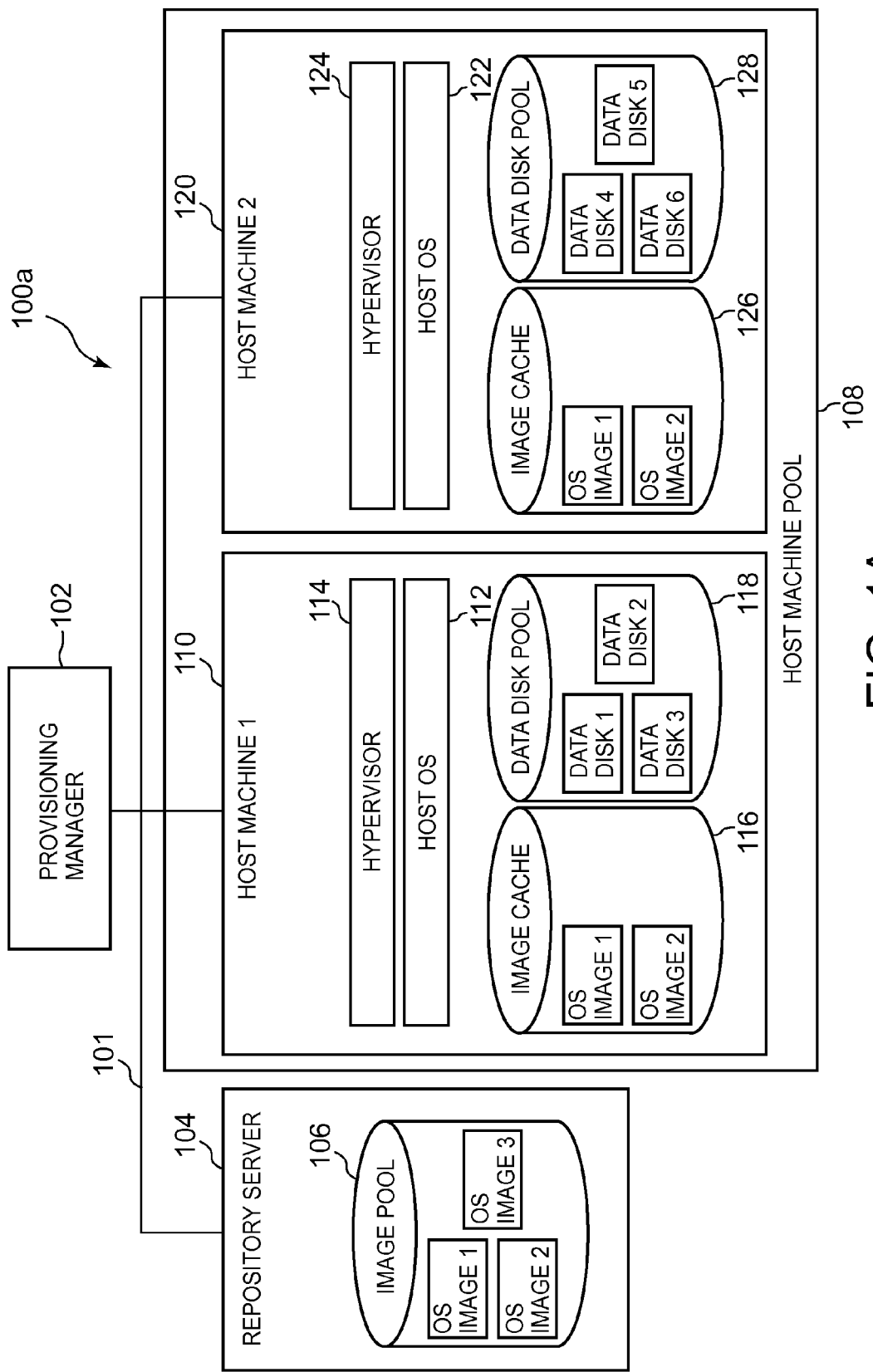
FIG. 1A is a view showing an initial state of a provisioning system before a request is received.

The present invention provides a technique for selecting OS images to be preliminarily cached in a data processing system used for provisioning.

A method is provided in a provisioning system that includes a first pool having the images of a plurality of different operating systems (OS) and a second pool having a plurality of data processing systems, for selecting one or more OS images that are to be cached in a target data processing system which is one of the plurality of data processing systems from the plurality of OS images in the first pool. The method causes a computer to execute the steps of: calculating the probability that the respective OS images in the first pool will be used in the next provisioning; and determining, among all combinations of one or more OS images that can be selected from the plurality of OS images in the first pool so as to be cached in the target data processing system, a combination of one or more OS images as one or more OS images that are to be cached, which minimizes an expected value of the time needed for transmitting OS images to the target data processing system in the next provisioning, the expected value being obtained assuming the caching.

Preferably, the step of calculating the probability includes a step of obtaining the probability with respect to the respective OS images in the first pool by calculating the number of resources that are created using the OS image and currently running in any one of the data processing systems in the second pool. The calculated number of resources for each OS image can be divided by the total number of resources that are currently running in the provisioning system and can be used for calculating the expected value of the transmission time as it is.

More preferably, the determining step includes: a step of calculating the pattern of $x_i$ maximizing the sum of $p_i*S_i*x_i$ with respect to all OS images in the first pool under the condition that the total size of one or more OS images to be cached does not exceed a cache size of the target data processing system where the size of the i-th OS image in the first pool is $S_i$, the number of resources that are created using the OS image and currently running is $p_i$, and a two-valued variable indicating the cache state in the target data processing system, of the OS image is $x_i$; and a step of determining a combination of one or more OS images minimizing the expected value of the transmission time based on the calculated $x_i$ pattern.

Further preferably, the pattern of $x_i$ maximizing the sum of $p_i*S_i*x_i$ with respect to all OS images in the first pool is calculated using an approximation algorithm for the 0-1 knapsack problem.

Still more preferably, the method further includes the steps of: calculating, in response to a request to transmit OS images in the first pool in the target data processing system during the provisioning, the number of resources that are created using any one of remaining OS images excluding an OS image being used in the target data processing system from one or more OS images cached in the target data processing system, and currently running in any one of the data processing systems in the second pool; determining a new combination of one or more OS images minimizing the expected value of the time needed for transmitting OS images to the target data processing system using a value obtained by subtracting the total size of the OS image being used and the OS images that are newly transmitted from the cache size as a new cache size; and deleting OS images that are not included in the newly determined combination among the remaining OS images from the target data processing system.

Moreover, preferably, the resource provided by the provisioning is a virtual machine which is provided by a hypervisor on any one of the data processing systems in the second pool using any one of the OS images in the first pool.

Moreover, preferably, the first pool further includes one or more differential images associated with the respective OS images, that are obtained by subtracting the OS image from a customized OS image created based on the OS image, and the combination of one or more OS images in the first pool, resulting in the minimum expected value minimizes an expected value of the time needed for transmitting the OS image and a differential image associated with the OS image.

While the present invention has been described as a method for selecting one or more OS images to be cached, the present invention can be understood as a selection program for causing a computer to execute the selection method and a selection device implemented by installing the selection program in a computer.

According to the present invention, a combination of one or more OS images minimizing the expected value of the time needed for transmitting OS images to a data processing system used for provisioning is determined. The determined combination is determined as a combination of one or more OS images to be preliminarily cached in the data processing system. Therefore, when one or more OS images are preliminarily cached in accordance with the determination, it is possible to increase the probability that it is only necessary to transmit a differential image obtained by subtracting a base OS image being cached from a customized OS image during the provisioning. Thus, it is possible to further accelerate the provisioning. The other advantages of the invention will become clear from the description of respective embodiments of the present invention.

As described above, Amir Husain discloses a method for acquiring and transmitting the differential data of the image file. However, it does not describe a method for caching a base image file and selecting an image file to be cached in order to accelerate the provisioning through the transmission of only the differential data of the image file.

The present invention will be described with respect to an embodiment thereof with reference to the drawings. The embodiment described below, however, is not limiting of the present invention set forth in the appended claims, and all combinations of features described in the description of the embodiment are not necessarily indispensable to the solution according to the present invention.

Before describing the present invention, a provisioning system on which the present invention is based will be described with reference to FIGS. 1A to 1C. FIG. 1A shows an initial internal state of a provisioning system 100*a* before a request from a user is received. The provisioning system 100*a* is configured to include: a provisioning manager 102 that receives a request for resources from a user, constructs a virtual machine meeting the request, and provides the virtual machine to the user; a repository server 104 serving as an image pool 106 that stores a plurality of types of operating systems (OS) used for constructing the virtual machine; and a host machine pool 108 including a plurality of host machines 110 and 120 used for constructing the virtual machine. The provisioning manager 102, the repository server 104, and the respective host machines 110 and 120 in the host machine pool 108 are connected to each other through a network 101.

Although FIG. 1A shows two host machines disposed in the host machine pool 108, it should be noted that the number of host machines is not limited.

The host machines 110 and 120 in the host machine pool 108 include image caches 116 and 126 and data disk pools 118 and 128, respectively. The image caches 116 and 126 store the images of major OS received in advance from the repository server 104. The data disk pools 118 and 128 store formatted, fixed-size data disks. Moreover, hypervisors 114 and 124 that run on host OS 112 and 122 are installed in the respective host machines 110 and 120, respectively, so that the host machines 110 and 120 can construct and manage the virtual machine in accordance with instructions of the provisioning manager 102.

Figure 1B:
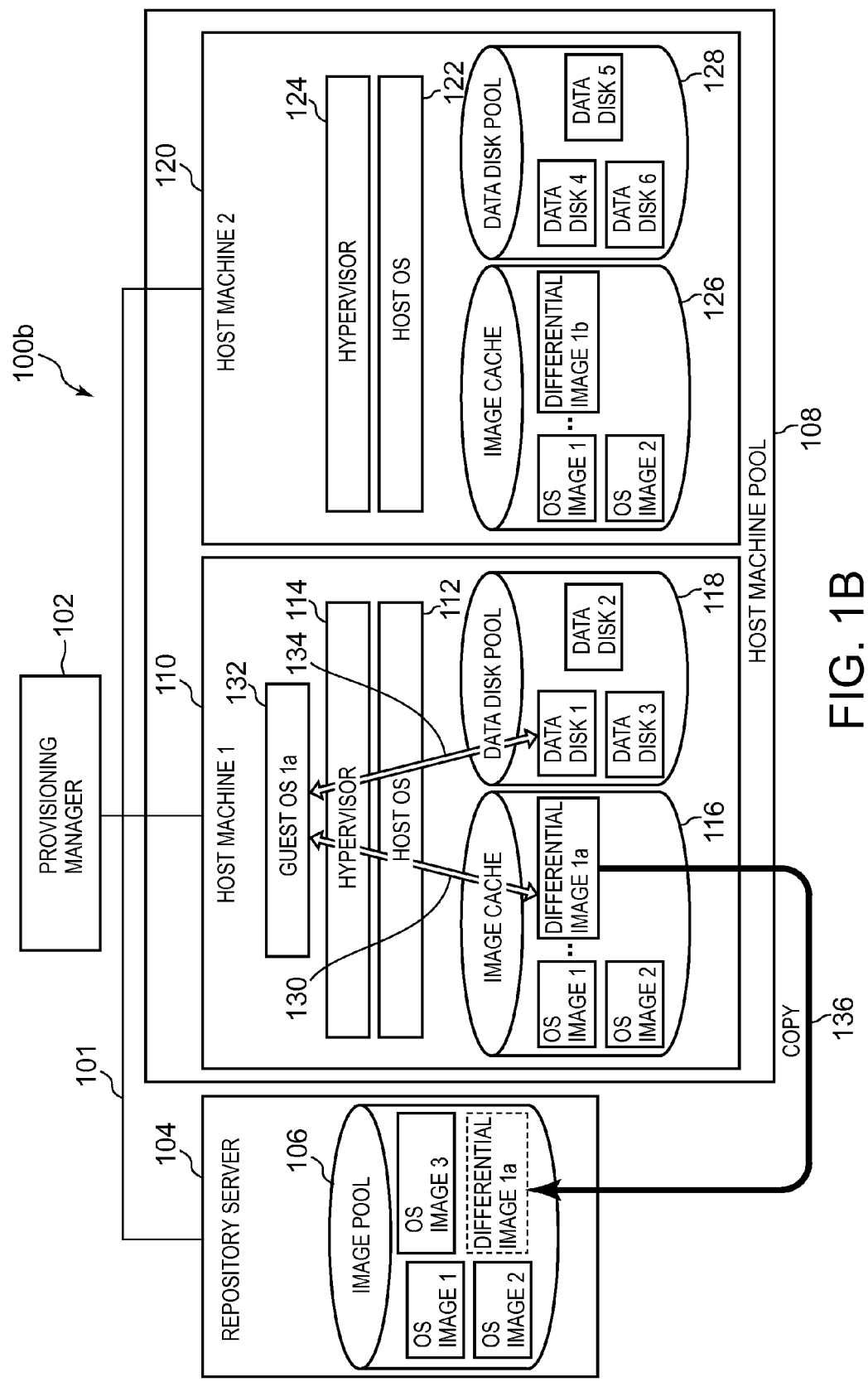
FIG. 1B is a view showing the state of the provisioning system when a first request is received.

FIG. 1B shows the internal state of a provisioning system 100*b* when a request is received from a user. Upon receiving a request for resources from a user, the provisioning manager 102 selects a host machine that is most suitable for constructing a virtual machine meeting the request of the user. In the example shown in FIG. 1B, the request of the user is a virtual machine which is constructed using an OS image 1. Since any of the host machines 110 and 120 has the OS image 1 cached in the image caches 116 and 126, the time required for constructing the virtual machine is the same regardless of which host machine is selected. In the example shown in FIG. 1B, the provisioning manager 102 selects the host machine 110 in order to construct the virtual machine.

Upon receiving the instruction to construct a virtual machine using the OS image 1 from the provisioning manager 102, the hypervisor 114 of the host machine 110 creates a differential image 1a of the OS image 1 as copy-on-write (cow) data. Subsequently, the hypervisor 114 combines the OS image 1 serving as a base and the differential image 1a to create a snapshot volume to be used as a system disk of a guest OS 1a 132 constructed as the virtual machine (see arrow 130).

The snapshot volume can be created using Logical Volume Manager for Linux (trademark), for example. However, if it is unable to create such a snapshot volume, the system disk of the guest OS 1a 132 can be created by merging the OS image 1 serving as a base and the differential image 1a together. In the merge process, the presence of modified data in the cow data is determined for each data processing unit, and copying is performed from the modified data in the cow data if present, or from the corresponding location of the original OS image 1 serving as the base if not present to thereby create the system disk. Thus, when the system disk is created by the merge process, the processing requires a longer period than when the snapshot volume is directly created.

The hypervisor 114 selects an available data disk from the data disk pool 118 and allocates the data disk to the guest OS 1a 132 (see arrow 134). Finally, the hypervisor 114 boots the guest OS 1a 132. The provisioning manager 102 provides the booted guest OS 1a 132 to the user. The user can perform customizations such as changing the settings or adding applications with respect to the OS image 1. In this case, customization information is stored in the differential image 1a created as the cow data. The user having performed customizations can request the provisioning manager 102 to store the customization information when the user terminates the use of the guest OS 1a 132. When storing is requested, the differential image 1a which is the customization information is transmitted from the host machine 110 to the repository server 104 and stored in the image pool 106 (see arrow 136).

Figure 1C:
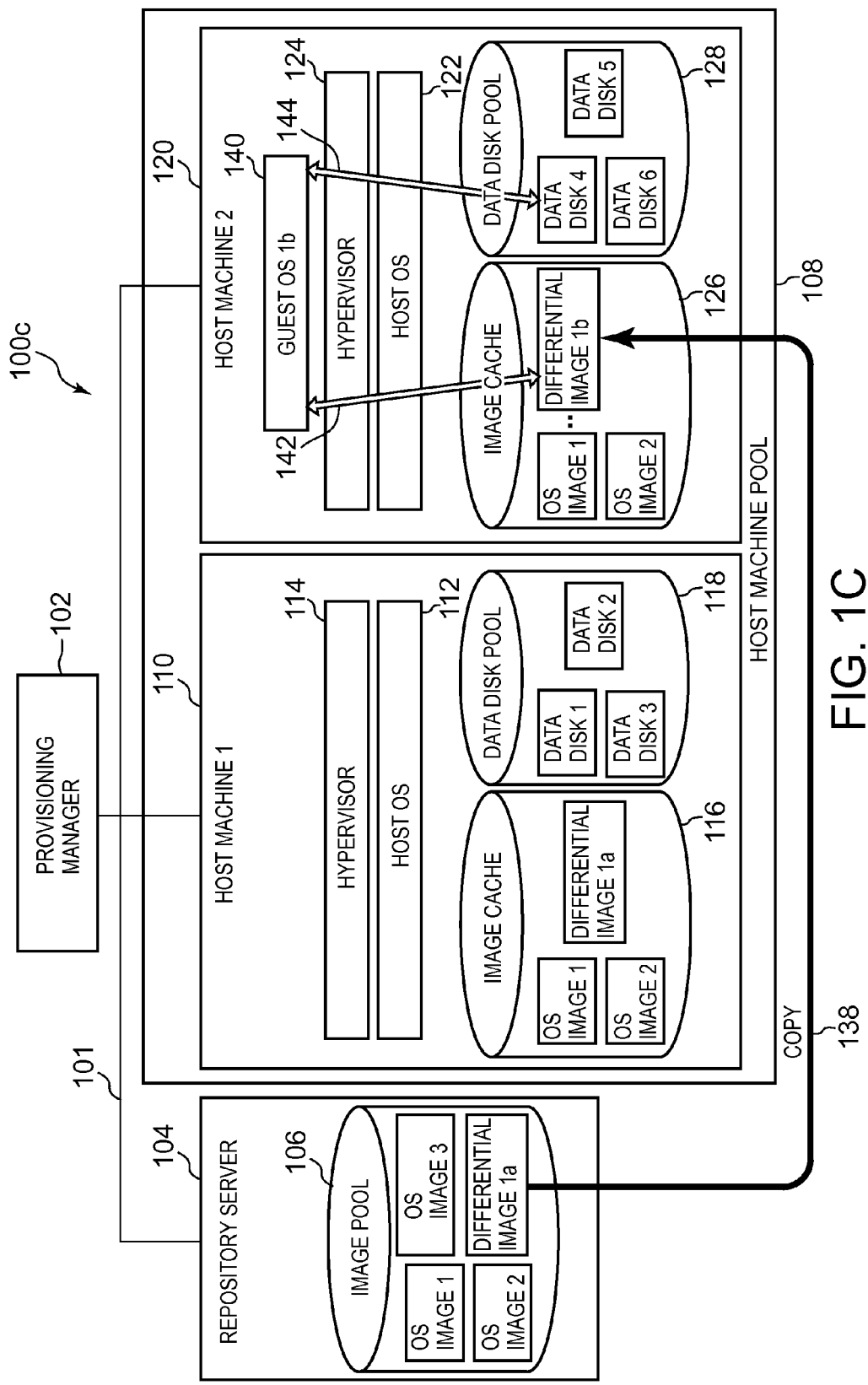
FIG. 1C is a view showing the state of the provisioning system when a second request is received.

FIG. 1C shows the internal state of a provisioning system 100c when a new request is received from a user after the provisioning shown in FIG. 1B is performed. In the example shown in FIG. 1C, the request of the user is a virtual machine which is constructed using the OS image 1. In this case, since the host machine 110 is selected previously, the provisioning manager 102 selects the host machine 120 and provides the virtual machine.

Upon receiving the instruction to construct a virtual machine using the OS image 1 from the provisioning manager 102, the hypervisor 124 of the host machine 120 copies the differential image 1a from the image pool 106 of the repository server 104 into the image cache 126 as a differential image 1b (see arrow 138). Subsequently, the hypervisor 124 combines the OS image 1 serving as a base and the differential image 1b to create a snapshot volume to be used as a system disk of a guest OS 1b 140 constructed as the virtual machine (see arrow 142).

The hypervisor 124 selects an available data disk from the data disk pool 128 and allocates the data disk to the guest OS 1b 140 (see arrow 144). Finally, the hypervisor 124 boots the guest OS 1b 140. The provisioning manager 102 provides the booted guest OS 1b 140 to the user.

As described above, in order to make it necessary to transmit only the differential image which is the customization information from the repository server 104 to the host machines 110 and 120 during actual provisioning, the images of major OS serving as the base can be stored in advance in the respective host machines 110 and 120. However, in the present invention, in order to further accelerate the provisioning, a more efficient method of selecting the image of an OS serving as the base to be cached is developed. The selection method will be described below.

The method of selecting the image of an OS serving as the base to be cached according to the present invention can be implemented in any one of the provisioning manager 102 and the respective host machines 110 and 120 in the host machine pool 108, which constitute the provisioning systems 100a, 100b, and 100c. However, from the perspective of computation speed and effective utilization of resources, the present invention is preferably implemented in each of the respective host machines 110 and 120 and processing is distributed among the host machines 110 and 120. In the following description, a case in which the present invention is implemented in the respective host machines 110 and 120 in the host machine pool 108 will be described. A host machine that implements the present invention will be referred to as a selected device.

Figure 2:
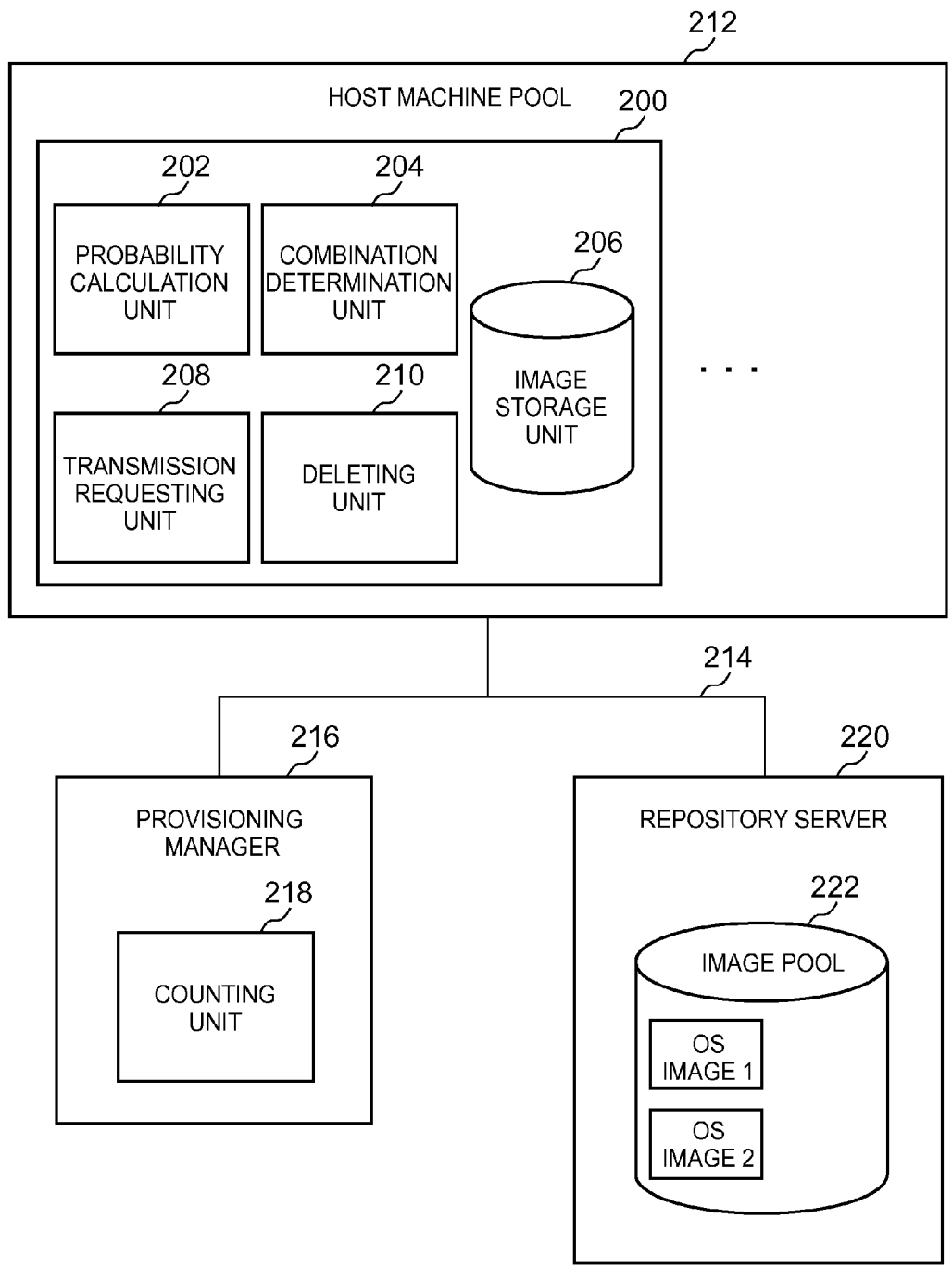
FIG. 2 is a functional block diagram of a selection device 200 according to an embodiment of the present invention.

FIG. 2 shows a functional block diagram of a selection device 200 according to an embodiment of the present invention. In the present embodiment, the selection device 200 constitutes a host machine pool 212 in a provisioning system together with other host machines not shown. The selection device 200 is connected to a provisioning manager 216 that receives a request for resources from a user and provides a resource meeting the request to the user and a repository server 220 serving as an image pool 222 having the images of a plurality of different OS through a network 214. Moreover, in order to select the images of one or more OS to be cached from the image pool 222, the selection device 200 includes a probability calculation unit 202, a combination determination unit 204, an image storage unit 206 storing the base images of one or more OS to be cached, a transmission requesting unit 208, and a deleting unit 210.

Here, the images of a plurality of different OS stored in the image pool 222 of the repository server 220 can be the images of Linux (trademark) OS such as Red Hat or Open SUSE, and the images of Windows (registered trademark) OS, for example. Moreover, the image pool 222 can further include differential image(s) obtained by subtracting the image of a base OS from the image of a customized OS with respect to the respective OS images. In the following description, the image of a base OS will be referred to as a base image.

The provisioning manager 216 further includes the function (counting unit 218) of a counter in addition to the functions of the provisioning manager 102 described with reference to FIGS. 1A to 1C. Details of the counting unit 218 will be described later. The selection device 200 further includes a functional configuration for constructing a resource in accordance with the instruction of the provisioning manager 216 similarly to the respective host machines 110 and 120 in the host machine pool 108 described with reference to FIGS. 1A to 1C. The functional configuration is the same as described above, and description thereof will be omitted here.

The probability calculation unit 202 calculates the probability that each of the respective base images in the image pool 222 will be used in the next provisioning. The probability of a certain base image being used in the next provisioning can be calculated based on an assumption that it is proportional to the number of resources that are created from the base image and currently running on any one of the host machine in the host machine pool 212.

That is, the probability calculation unit 202 can calculate the probability of the respective base images in the image pool 222 by dividing the number p of resources that are created using the base image and any one of the host machines in the host machine pool 212 and currently running by the number N of resources that are created using any one of the base images in the image pool 220 and any one of the host machines in the host machine pool 212 and currently running.

In the present embodiment, the resource which is created using the base image and the host machine in order to perform the provisioning will be referred to as a virtual machine. Moreover, during the process of selecting a base image to be cached, the probability calculation unit 202 calculates the probability with respect to the respective base images in a first pool. However, during the process of deleting a base image, which is performed when there is a cache miss, the probability is calculated with respect to remaining base images excluding a base image being used in the selection device 200 from one or more base images cached in the image storage unit 206.

Figure 3:
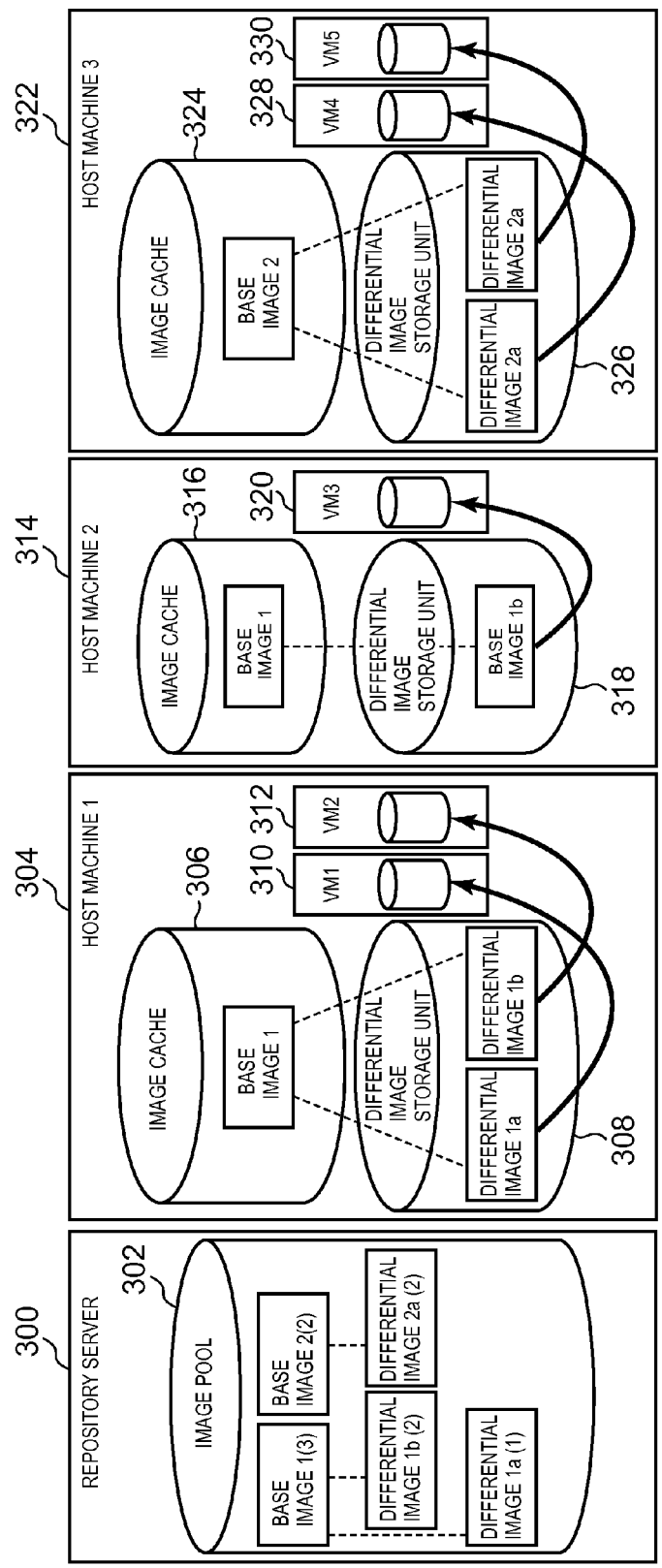
FIG. 3 is a view showing the state of the provisioning system at a certain point of time.

Here, a method of counting the number p of virtual machines that are created by provisioning and currently running will be described in detail with reference to FIG. 3. FIG. 3 shows the current states of a repository server 300 in a certain provisioning system and host machines 304, 314, and 322 in a host machine pool. It is assumed that only three host machines 304, 314, and 322 shown in FIG. 3 are included in the host machine pool.

First, a base image 1 stored in an image pool 302 will be focused on. The base image 1 is associated with differential images 1a and 1b. Thus, virtual machines that are created from the base image 1 and currently running include three virtual machines that are virtual machines 310 and 312 in the host machine 304 and a virtual machine 320 in the host machine 314. Therefore, the number p of virtual machines being run is 3 for the base image 1.

On the other hand, a base image 2 is associated with only a differential image 2a. Thus, virtual machines that are created from the base image 2 and currently running include two virtual machines that are virtual machines 328 and 330 in the host machine 322, and the number p of virtual machines being run is 2 for the base image 2. Moreover, since virtual machines that are currently running in the provisioning system shown in FIG. 3 include five virtual machines 310, 312, 320, 328, and 330, the number N of virtual machines is 5. Thus, the probability calculated finally becomes 3/5=0.6 for the base image 1 and 2/5=0.4 for the base image 2.

The probability calculation unit 202 can request the provisioning manager 216 to calculate the number p of virtual machines that are currently running for each base image and counted in this way and acquire the number p of virtual machines that are currently running for each base image from a counting unit 218 described later, of the provisioning manager 216. Moreover, the probability calculation unit 202 can calculate the number N of virtual machines that are created from any one of the base images in the image pools 222 and currently running by summing the number p of virtual machines that are currently running for each base image.

The provisioning manager 216 of the present embodiment includes the counting unit 218, and the counting unit 218 has a counter for each of the base images in the image pool 222. In response to the provisioning manager 216 receiving a request from a user to create a virtual machine, the counting unit 218 increments the counter of a base image designated by the request by 1. Moreover, in response to the provisioning manager 102 receiving a request to discard a virtual machine, the counting unit 218 decrements the counter of a base image designated by the request by 1. In response to a request from the probability calculation unit 202, the counting unit 218 restores the present values of the counters of the respective base images to the number p of virtual machines that are created from the base image and are currently running.

Upon acquiring the number p of virtual machines that are currently running for each base image from the provisioning manager 216, the probability calculation unit 202 calculates the probability p/N of the respective base images to be used for the next provisioning based on the number p and delivers the probability p/N to the combination determination unit 204 described later. The probability calculation unit 202 can deliver the number p of virtual machines that are currently running of the respective base images to the combination determination unit 204 described later as it is instead of the probability p/N.

In the combination determination unit 204, among all combinations of one or more base images that can be selected from one or more base images in the image pool 222 so as to be cached in the selection device 200, a combination of one or more base images, which minimizes an expected value $E_1$ of the time needed for transmitting images to the selection device 200 in the next provisioning, obtained assuming the caching of the combination of base images is determined as one or more base images that are to be cached in the selection device 200. The expected value $E_1$ of the transmission time which is focused on here is the expected value of the transmission time of a custom image in which a base image and a differential image associated with the base image are combined. However, as will be described later, the combination of base images resulting in the minimum expected value also minimizes the expected value of the transmission time of the base image as well as the expected value $E_1$ of the transmission time of the custom image.

The expected value $E_1$ of the transmission time of the custom image is expressed by the following expression.

$$E_1 = \sum_i \sum_{j \in D_i} \frac{n_j}{N} \frac{(1-x_i)S_i + \Delta_j}{T} \qquad \text{Expression 1}$$

In the above expression, respective variables are defined as follows.

i: indices of the respective base images stored in the image pool 222

$x_i$: two-valued variable indicating a cache state of a base image of the index i in the image storage unit 206, which has a value of 1 when the base image is cached and has a value of 0 when the base image is not cached.

$S_i$: size of a base image of the index i j: indices of the respective differential images stored in the image pool 222

$D_i$: collection of indices of differential images associated with a base image of the index i $\Delta_j$: size of a differential image of the index j T: throughput of image copying in the selection device 200

N: number of running virtual machines in a provisioning system $n_j$: number of running virtual machines created using the differential image of the index j How the expected value $E_1$ of the transmission time of the custom image is expressed by Expression 1 will be described. As described above, the two-valued variable $x_i$ indicates that a base image of the index i is cached in the image storage unit 206 when $x_i=1$, and the base image of the index i is not cached in the image storage unit 206 when $x_i=0$. Thus, when $x_i=0$, since the base image of the index i is not cached in the image storage unit 206, the transmission time of the custom image which is created based on the base image of the index i and the differential image of the index j becomes $(S_i+\Delta_j)/T$. Here, the index j is an element of the collection $D_i$ (the same applies to the following description).

On the other hand, when $x_i=1$, since the base image of the index i is cached in the image storage unit 206, the transmission time of the custom image which is created based on the base image of the index i and the differential image of the index j becomes $\Delta_j/T$. These two cases can be expressed as follows using the two-valued variable $x_i$. That is, the transmission time of the custom image which is created based on the base image of the index i and the differential image of the index j is expressed by $\{(1-x_i)*S_i+\Delta_j\}/T$.

Moreover, in the present embodiment, it is assumed that the probability of the differential image of the index j to be used in the next provisioning is proportional to the number of virtual machines that are created from the differential image of the index j and currently running. Then, the probability is expressed by $n_j/N$. Thus, the expected value $E_1$ of the transmission time of the custom image is calculated by summing the product of $\{(1-x_i)*S_i+\Delta_j\}/T$ indicating the transmission time of the individual custom image and the probability $n_j/N$ of the custom image to be used in the next provisioning with respect to all custom images, and finally, Expression 1 is obtained.

Moreover, in Expression 1, calculating the allocation of $x_i$ that minimizes the expected value $E_1$ of the transmission time is equivalent to calculating the combination of one or more base images cached in the selection device 200.

Here, the right side of Expression 1 is modified using the number of running virtual machines calculated for each of the base images in the image pool 222. The number of running virtual machines is acquired by requesting the probability calculation unit 202 to calculate instead of the probability $n_j/N$ as described above. Then, the expected value $E_1$ of the transmission time of the custom image is rewritten as follows.

$$E_1 = \frac{1}{NT}\left(\sum_i p_i S_i + \sum_i \sum_{j \in D_i} n_j \Delta_j - \sum_i p_i S_i x_i\right) \quad \text{Expression 2}$$

where $$p_i = \sum_{j \in D_i} n_j$$

Here, $p_i$ indicates the number of running virtual machines using a custom image created from the base image of the index i, calculated by the probability calculation unit 202.

Looking at Expression 2, the first and second terms become constants since they do not include $x_i$. Thus, in order to minimize the expected value $E_1$ of the transmission time, the third term can be minimized. However, the third term is a negative term. Eventually, in order to minimize the expected value $E_1$ of the transmission time, the following expression can be maximized.

$$\sum_i p_i S_i x_i \quad \text{Expression 3}$$

Since the expected value of the transmission time of the base image is obtained by eliminating the second term from Expression 2, it should be noted that the combination of base images minimizing the expected value $E_1$ of the transmission time of the custom image also minimizes the expected value of the transmission time of the base image.

However, the combination of base images that can be selected from one or more base images in the image pool 222 so as to be cached in the selection device 200 needs to ensure that the total size of the combination of base images does not exceed the cache size of the selection device 200. Thus, in order to maximize Expression 3, a condition expressed by the following expression is added.

$$\sum_i S_i x_i \leq W, x_i \in \{0, 1\} \quad \text{Expression 4}$$

Here, W indicates the cache size (for example, the volume of the image storage unit 206) of the selection device 200.

As described above, calculating the allocation of $x_i$ minimizing the expected value $E_1$ of the transmission time is reduced to maximizing the value expressed by Expression 3 under the condition expressed by Expression 4. This can be understood as the 0-1 knapsack problem and can be solved by an approximation algorithm for the 0-1 knapsack problem.

The 0-1 knapsack problem is a problem: "given a knapsack of the volume M and N items (k-th item has a value 'value[k]' and a volume 'weight[k]'), which items should be selected to maximize the sum of the values of items filled in a knapsack under the condition that the sum does not exceed the volume M of the knapsack".

Thus, the problem of calculating the allocation of $x_i$ minimizing the expected value $E_1$ of the transmission time can be solved as the 0-1 knapsack problem by substituting the cache of the size W by the knapsack of the volume M, the respective base images in the image pool 222 by the N items, the size $S_i$ of the base image by the weight[k] of the item, and $(p_i*S_i)$ for the base image by the value[k] of the item.

The solution to the 0-1 knapsack problem is known, and a plurality of algorithms is proposed. In the present embodiment, an algorithm disclosed in Timothy J. Rolfe, "An Alternative Dynamic Programming Solution for the 0/1 Knapsack", ACM SIGC SE Bulletin, Volume 39, Issue 4, December 2007, Pages 54 to 56, Section 3 (hereinafter "Rolfe") is used. This solution is a method of calculating the maximum sum of values by a bottom-up method while testing N items (the k-th item has a value[k] and a volume weight[k]) one by one under the condition of the volume M of the knapsack. An overview of the algorithm will be described below.

First, as a preliminary preparation, an array bestVal[wt] for storing the maximum sum of values calculated for the respective volumes wt (integer equal to or larger than 0 and equal to or less than M) is prepared, and elements of wt=0 are initialized to value 0. Moreover, a M×N-size, 2-dimensional Boolean array trial[wt][k] indicating a combination of items, which results in the maximum sum of values is prepared with respect to the respective volumes wt (integer equal to or larger than 0 and equal to or less than M), and the respective elements are initialized to false. Then, the following processes (1) to (4) are repeated in increasing order of volume wt to thereby calculate the maximum sum of values with respect to the respective volumes wt and the combination of items resulting in the maximum sum. In this case, it is assumed that bestVal[wt]>=bestVal[wt−1], and the value of bestVal[wt] is initialized to the value of bestVal[wt−1]. Moreover, the identifier bestK of an item resulting in the maximum sum is initialized to value 0.

(1) A case of inserting the k-th item (k is a positive integer of 1 to N) into the knapsack among the N items will be considered. First, it is ensured that the volume of the item does not exceed the volume wt when the k-th item is inserted and that the same items are not used redundantly when the k-th item is inserted. If any one of the two conditions is not satisfied, the k-th item is excluded from test targets. Here, the redundant use of the same items can be detected by checking the trial[wt-weight[k]] row.

(2) When it is determined in process (1) that the k-th item is used as the test target, the maximum sum of values when the k-th item is inserted is compared with the maximum sum of values when the k-th item is not inserted, and the greater sum is used as the maximum sum of values.

(3) In process (2), the maximum sum of values when the k-th item is inserted is calculated by adding the value[k] of the k-th item to the maximum sum bestVal[wt-weight[k]] of values with respect to a volume obtained by subtracting the volume weight[k] of the k-th item from the present volume wt. Moreover, in process (2), when the maximum sum of values when the k-th item is inserted is greater than that when the k-th item is not inserted, the maximum sum of values is registered in bestVal[wt], and the identifier k of the item is registered in bestK.

(4) When the test for all items has been finished with respect to the volume wt, and the maximum sum of values greater than bestVal[wt−1] is obtained, the values of the respective elements on the wt-weight[bestK] row of a matrix trial are copied to the respective elements on the wt row. In this case, a value 'true' is registered in the element trial[wt][bestK]. This is because a collection of items maximizing the sum of values of items filled in the knapsack of the volume wt is a collection of items in which the bestK items are added to a collection of items maximizing the sum of values of items filled in the knapsack of the volume wt-weight[bestK]. On the other hand, when the maximum sum of values greater than bestVal[wt−1] is not obtained with respect to the volume wt, the values of the respective elements on the wt−1 row of the matrix trial are copied to the respective elements of the wt row.

When the allocation of $x_i$ minimizing the expected value $E_1$ of the transmission time are calculated using the approximation algorithm for the 0-1 knapsack problem, the combination determination unit 204 delivers the calculation results to the transmission requesting unit 208.

The transmission requesting unit 208 requests that the repository server 220 transmit base images based on the allocation results of $x_i$ delivered by the combination determination unit 204. That is, the transmission requesting unit 208 requests that the repository server 220 transmits base images of which the value of $x_i$ is 1. The base images received by the transmission requesting unit 208 are then stored and pre-cached in the image storage unit 206.

When there is no designated base image in the selection device 200 during the provisioning, and there is a request to transmit a base image in the image pool 222, the combination determination unit 204 determines a new combination of base images minimizing the expected value of the time needed to transmit the images to the selection device 200 with respect to remaining base images excluding a base image which is being currently used in the selection device 200 from one or more base images cached in the image storage unit 206.

The expected value $E_2$ of the transmission time which is focused on here is the expected value of the transmission time of a custom image in which a base image and a differential image associated with the base image are combined. However, as will be described later, the new combination of base images resulting in the minimum expected value $E_2$ also minimizes the expected value of the transmission time of the base image as well as the expected value of the transmission time of the custom image.

The new combination of base images is determined in order to prepare space for storing base images that are newly transmitted in the image storage unit 206. Thus, among the remaining base images (hereinafter simply referred to as remaining base images) excluding a base image which is being presently used in the selection device 200 from one or more base images cached in the image storage unit 206, a base image which is not included in the newly determined combination is deleted from the image storage unit 206.

The expected value $E_2$ of the transmission time of the custom image is calculated by the same thinking as described in relation to Expression 1 and expressed by the following expression.

$$E_2 = \sum_{i \in C-R} \sum_{j \in D_i} \frac{n_j}{N} \frac{(1-x_i)S_i + \Delta_j}{T} \qquad \text{Expression 5}$$

In the above expression, since the definitions of the respective variables are the same as those described in relation to Expression 1, newly introduced variables will be described herein.

C: collection of indices of base images stored in the image storage unit 206 of the selection device 200

R: collection of indices of base images used for generating virtual machines that are currently running in the selection device 200

In Expression 5, calculating the allocation of $x_i$ that minimizes the expected value $E_2$ of the transmission time is equivalent to calculating the combination of base images that are to be left in the image storage unit 206.

Here, the right side of Expression 5 is modified using the number of running virtual machines calculated for each of the base images in the remaining base images. The number of running virtual machines is acquired by requesting the probability calculation unit 202 to calculate instead of the probability $n_j/N$ as described above. Then, the expected value $E_2$ of the transmission time is rewritten as follows.

$$E_2 = \frac{1}{NT}\left(\sum_{i \in C-R} p_i S_i + \sum_{i \in C-R}\sum_{j \in D_i} n_j \Delta_j - \sum_{i \in C-R} p_i S_i x_i\right) \qquad \text{Expression 6}$$

where $$p_i = \sum_{j \in D_i} n_j$$

Here, $p_i$ indicates the number of running virtual machines using a custom image created from the base image of the index i, calculated by the probability calculation unit 202.

Looking at Expression 6, the first and second terms become constants since they do not include $x_i$. Thus, in order to minimize the expected value $E_2$ of the transmission time, the third term can be minimized. However, the third term is a negative term. Eventually, in order to minimize the expected value $E_2$ of the transmission time, the following expression can be maximized.

$$\sum_i p_i S_i x_i \qquad \text{Expression 7}$$

Since the expected value of the transmission time of the base image is obtained by eliminating the second term from Expression 6, it should be noted that the combination of base images minimizing the expected value $E_2$ of the transmission time of the custom image also minimizes the expected value of the transmission time of the base image.

However, it is to be ensured that the base images that are currently running in the selection device 200 are stored in the image storage unit 206, and space for the base images that are newly transmitted is also prepared in the image storage unit 206. Thus, in order to maximize Expression 7, a condition expressed by the following expression is added.

$$\sum_{i \in C-R} S_i x_i \le W - S_k - \sum_{i \in R} S_i, \ x_i \in \{0, 1\} \qquad \text{Expression 8}$$

Here, W indicates the cache size as described in relation to Expression 4. k indicates the indices of base images that are newly transmitted, and $S_k$ indicates the size of base images that are newly transmitted.

As described above, calculating the allocation of $x_i$ minimizing the expected value $E_2$ of the transmission time is reduced to maximizing the value expressed by Expression 7 under the condition expressed by Expression 8. This can be understood as the 0-1 knapsack problem and can be solved by an approximation algorithm for the 0-1 knapsack problem.

When the allocation of $x_i$ minimizing the expected value $E_2$ of the transmission time is calculated using the approximation algorithm for 0-1 knapsack problem, the combination determination unit 204 delivers the calculation results to the deleting unit 210.

The deleting unit 210 deletes base images stored in the image storage unit 206 based on the allocation results of $x_i$ delivered by the combination determination unit 204. That is, the deleting unit 210 deletes base images of which the value of $x_i$ is 0 from the image storage unit 206.

Figure 4:
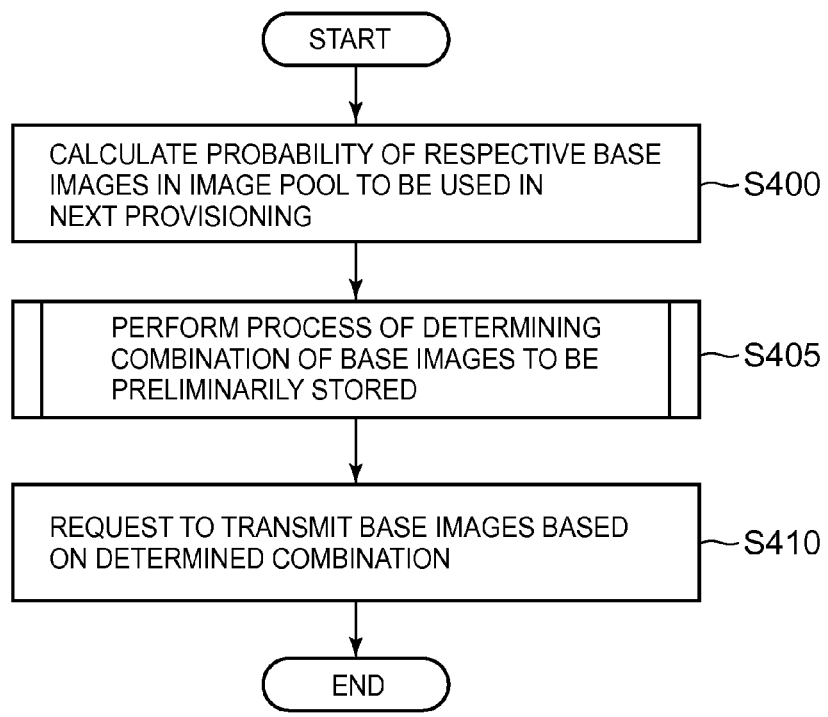
FIG. 4 is a flowchart showing the flow of a preliminary caching process performed by the selection device 200 according to an embodiment of the present invention.
Figure 5:
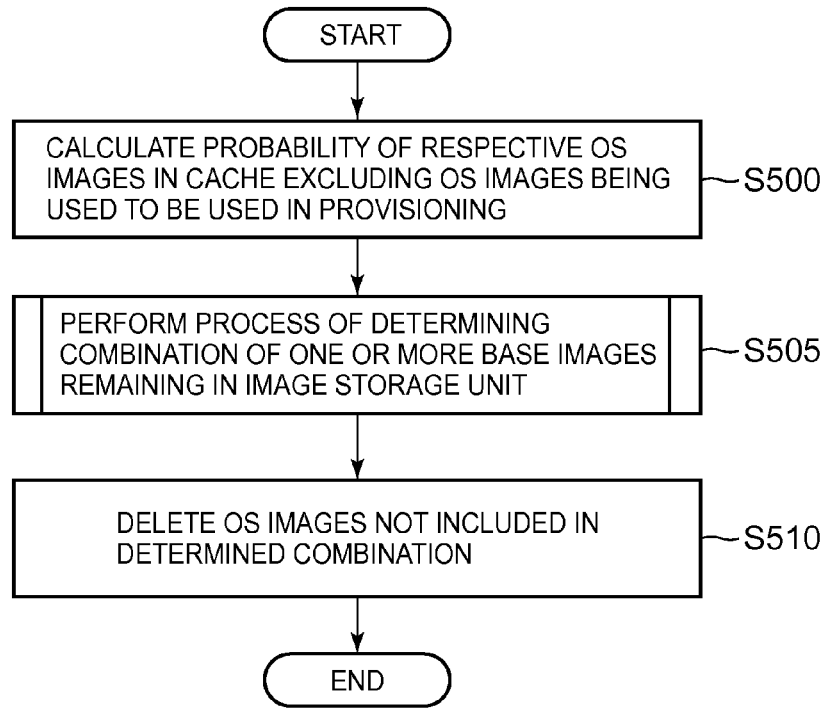
FIG. 5 is a flowchart showing the flow of an image deleting process performed by the selection device 200 according to an embodiment of the present invention when a cache miss occurs.

Next, the flow of the processes performed by the selection device 200 of the present invention will be described with reference to FIGS. 4 and 5. FIG. 4 is a flowchart showing the flow of a base image caching process performed by the selection device 200 of the present invention. FIG. 5 is a flowchart showing the flow of a base image deleting process performed by the selection device 200 of the present invention.

The process shown in FIG. 4 starts when the selection device 200 is newly added to the host machine pool 212 as a host machine, and the probability calculation unit 202 calculates the probability that the respective base images in the image pool 222 will be used in the next provisioning (step S400). The calculated probability for each base image is delivered to the combination determination unit 204.

As described above, the probability of a certain base image being used in the next provisioning can be calculated based on an assumption that it is proportional to the number of virtual machines that are created from the base image and currently running. Moreover, the probability calculation unit 202 can acquire the number of virtual machines that are currently running for each base image from the counting unit 218 of the provisioning manager 216 and deliver the acquired number of running virtual machines for each base image to the combination determination unit 204 as it is.

Upon receiving the probability or the number of running virtual machines for each base image from the probability calculation unit 202, the combination determination unit 204 determines, among all combinations of one or more base images that can be selected from one or more base images in the image pool 222 so as to be cached in the selection device 200, a combination of one or more base images, which minimizes an expected value of the time needed for transmitting base images to the selection device 200 in the next provisioning, obtained assuming the caching of the combination of base images as one or more base images that are to be cached (step S405). The determined combination of base images is delivered to the transmission requesting unit 208.

As described above, calculating the combination of base images minimizing the expected value of the transmission time is reduced to a calculating the pattern of $x_i$ maximizing the sum of $(p_i*S_i*x_i)$ for all base images in the image pool 222 under the condition that the total size of one or more base images to be cached does not exceed the cache size of the selection device 200. Moreover, this can be solved using the approximation algorithm for the 0-1 knapsack problem. The respective variables $p_i$, $S_i$, and $x_i$ have the meanings as described in relation to Expressions 1 and 2. The flow of the processes of the approximation algorithm for the 0-1 knapsack problem is described later with reference to FIG. 6.

The transmission requesting unit 208 requests that the repository server 220 transmit base images based on the determined combination of base images and stores base images received from the repository server 220 in the image storage unit 206 (step S410). In this way, the process ends.

The process shown in FIG. 5 starts from step S500 when a cache miss occurs in the selection device 200 during the provisioning, and the need to request the repository server 220 to transmit base images arises. In step S500, the probability calculation unit 202 calculates the probability that remaining base images excluding a base image being used in the selection device 200 from one or more base images cached in the image storage unit 206 will be used in the next provisioning. The calculated probability for each base image is delivered to the combination determination unit 204.

As described above, the probability of a certain base image being used in the next provisioning can be calculated based on an assumption that it is proportional to the number of virtual machines that are created from the base image and currently running. Moreover, the probability calculation unit 202 can acquire the number of virtual machines currently running for each base image from the counting unit 218 of the provisioning manager 216 and deliver the acquired number of running virtual machines for each base image to the combination determination unit 204 as it is.

Upon receiving the probability or the number of running virtual machines for each base image from the probability calculation unit 202, the combination determination unit 204 newly determines a combination of base images, which minimizes an expected value of the time needed for transmitting base images to the selection device 200 with respect to the remaining base images in the image storage unit 206 using a value obtained by subtracting the total size of base images being used and base images that are newly transmitted from the cache size of the selection device 200 as a new cache size (step S505). The determined combination of base images is delivered to the deleting unit 210.

As described above, calculating the combination of base images minimizing the expected value of the transmission time is reduced to calculating the pattern of $x_i$ maximizing the sum of $(p_i*S_i*x_i)$ for all the remaining base images in the image storage unit 206 under the condition that the total size of one or more base images remaining in the image storage unit 206 among the remaining base images in the image storage unit 206 does not exceed the new cache size. Moreover, this can be solved using the approximation algorithm for the 0-1 knapsack problem. The respective variables $p_i$, $S_i$, and $x_i$ have the meanings as described in relation to Expressions 5 and 6. The flow of the processes of the approximation algorithm for the 0-1 knapsack problem is described later with reference to FIG. 6.

The deleting unit 210 deletes the base images that are not included in the determined combination of base images from the image storage unit 206 based on the determined result of the combination of base images (step S510). In this way, the process ends.

Next, the flow of the processes of the approximation algorithm for the 0-1 knapsack problem will be described with reference to FIG. 6. First, the pseudo code of the algorithm is shown below. The pseudo code is based on the algorithm proposed by Rolfe, and the variables and arrays used therein are the same as those described in relation to the algorithm. In this pseudo code, the volume of the knapsack is defined as maxWeight, and the number of items is defined as n (the k-th item has a value[k] and a weight[k]).

```
01    for (wt=1; wt <= maxWeight; wt++ )
02    {intbestK=0, testWt;
03
04       //Initial guess: the knapsack for wt-1.
05       bestVal[wt]=bestVal[wt-1];
06       for (k=1; k <= n; k++ )
07       {testWt=wt-weight[k];
08        if(testWt >= 0 && ! trial[testWt][k] )
09        if(bestVal[wt] < value[k]+bestVal[testWt] )
10        {bestK=k;
11         bestVal[wt]=value[k]
12         + bestVal[testWt];
13        }
14       }
15       if (bestK> 0)
16       {testWt=wt-weight[bestK];
17        System.arraycopy(trial[testWt], 0,
18        trial[wt], 0, n+1);
19        trial[wt][bestK]= true;
20       }
21       else // Finish using the wt-1 solution
22        System.arraycopy(trial[wt-1], 0,
23        trial[wt], 0, n+1);
24    }
```

Figure 6:
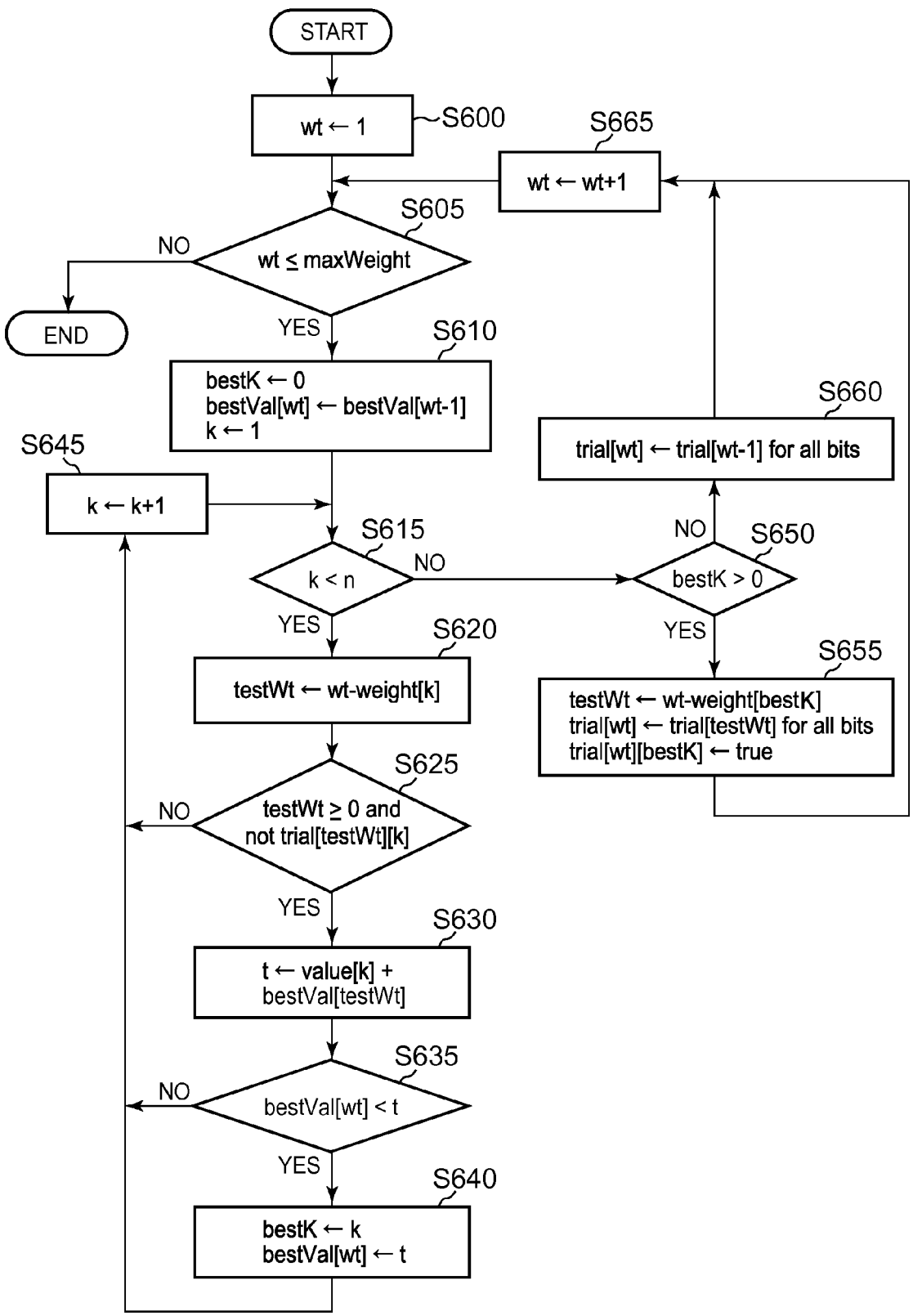
FIG. 6 is a flowchart showing the flow of the processes based on an approximation algorithm for the 0-1 knapsack problem.

FIG. 6 is a flowchart showing the flow of processes of the approximation algorithm for the 0-1 knapsack problem according to the pseudo code. The process shown in FIG. 6 starts from step S600, and first, the volume wt is set to value 1 in order to calculate the maximum sum of values in increasing order of volume. Subsequently, in step S605, it is determined whether the volume wt is equal to or less than max-Weight.

In step S605, if the volume wt is equal to or less than maxWeight, the process proceeds to step S610. In step S610, the maximum sum bestVal[wt] of values of items filled in the knapsack of the volume wt is initialized to value bestVal[wt−1], and the items bestK resulting in the maximum sum are initialized to value 0. Moreover, the index k of a test target item is set to value 1.

Subsequently, in step S615, it is determined whether the index k of the test target item is smaller than n. When the index k of the test target item is smaller than n, namely the test for all of n items has not been finished (step S615: Yes), the process proceeds to step S620. In step S620, a value obtained by subtracting the volume weight[k] of the item of the index k from the volume wt is set as a variable testWt indicating a remaining empty volume.

Subsequently, in step S625, it is determined whether the value of the variable testWt is equal to or greater than 0, and trial[testWt][k] is false. When the value of the variable testWt is equal to or greater than 0, and trial[testWt][k] is false, namely the sum does not exceed the volume wt even if the item of the index k is inserted, and the item of the index k is not one of the items maximizing the sum of values for the volume testWt (step S625: Yes), the process proceeds to step S630. The maximum sum t of values when the item of the index k is inserted is calculated by adding the value of value [k] to the value of bestVal[testWt].

Subsequently, the process proceeds to step S635, and it is determined whether the maximum sum t of values when the item of the index k is inserted is greater than the maximum sum bestVal[wt] of values when the item of the index k is not inserted. When the maximum sum t of values when the item of the index k is inserted is greater than the maximum sum bestVal[wt] (step S635: Yes), the process proceeds to step S640. In step S640, the maximum sum t of values when the item of the index k is inserted is set as bestVal[wt], and the value of the index k is set as bestK.

In step S625, when the value of the variable testWt is smaller than 0, or trial[testWt][k] is true, namely the sum exceeds the volume wt if the item of the index k is inserted, or the item of the index k is one of the items maximizing the sum of values for the volume testWt (step S625: No), the process proceeds to step S645. Moreover, in step S635, when the maximum sum bestVal[wt] of values when the item of the index k is not inserted is greater than the maximum sum t (step S635: No), the process proceeds to step S645. Furthermore, the process proceeds to step S645 when the operation of step S640 ends. In step S645, the index k of the item is incremented by 1. Then, the process returns to step S615, and the same process is performed again for an item of the next index.

In step S615, when the index k of the test target item is equal to n, namely the test for all of n items has been finished with respect to the volume wt (step S615: No), the process proceeds to step S650. In step S650, it is determined whether the value of bestK is greater than 0. When the value of bestK is greater than 0 (step S650: Yes), namely the maximum sum of values greater than bestVal[wt−1] is obtained with respect to the volume wt, a value obtained by subtracting the volume weight[bestK] of the item of the index bestK from the volume wt is set to the variable testWt, the values of the respective elements on the trial[testWt] row are copied to the respective elements on the trial[wt] row, and a value 'true' is overwritten to the element trial[wt][bestK] (step S655).

On the other hand, when the value of bestK is 0 (step S650: No), namely the maximum sum of values greater than bestVal [wt−1] is not obtained with respect to the volume wt, the values of the respective elements on the trial[testWt−1] row are copied to the respective elements on the trial[wt] (step S660). Through any one of the operations of steps S655 and S660, a combination of items maximizing the sum of values of items filled in the knapsack of the volume wt is registered in trial[wt].

The process proceeds to step S665 when the operation of step S655 or S660 ends, and the volume wt is incremented by 1. Subsequently, the process returns to step S605, and the series of processes described above are repeated until the volume wt exceeds the target maxWeight. In step S605, when the volume wt exceeds maxWeight, the process ends.

The combination of items maximizing the sum of values with respect to the volume maxWeight, which is to be calculated finally is obtained from the respective values on the trial[maxWeight] row. That is, if trial[maxWeight][k]=true, the item of the index k is one of the items maximizing the sum of values with respect to the volume maxWeight. If trial [maxWeight][k]=false, the item of the index k is not one of the items maximizing the sum of values with respect to the volume maxWeight.

The approximation algorithm for the 0-1 knapsack problem described with reference to FIG. 6 is applied to the present invention as follows. First, U is used as the unit (for example, 256 MB) of the size of the base image. Moreover, the following values are set to the respective variables:

maxWeight=value (for example, 100 GB) of the cache size rounded up to the nearest unit U N=total number of base images serving as candidates to be cached wdight[i]=value of the size $S_i$ of a base image of the index i rounded up to the nearest unit U value[i]=$p_i$*$S_i$ bestValue=array of number of elements maxWeight/U (initial values of respective elements are 0)

trial=2-dimensional Boolean array of number of elements maxWeight/U by N (initial values of respective elements are 'false')

$x_i$=1 if trial[maxWeight[i]=true, $x_i$=0 if false

In the approximation algorithm, the processing is accelerated by approximating the item size which is originally a continuous quantity to a discrete quantity. The accuracy and speed of the processing change depending on the size of the discrete unit U. That is, as the unit U increases, the accuracy decreases although the speed of the algorithm increases. Conversely, as the unit U decreases, the accuracy increases although the speed of the algorithm decreases.

Figure 7:
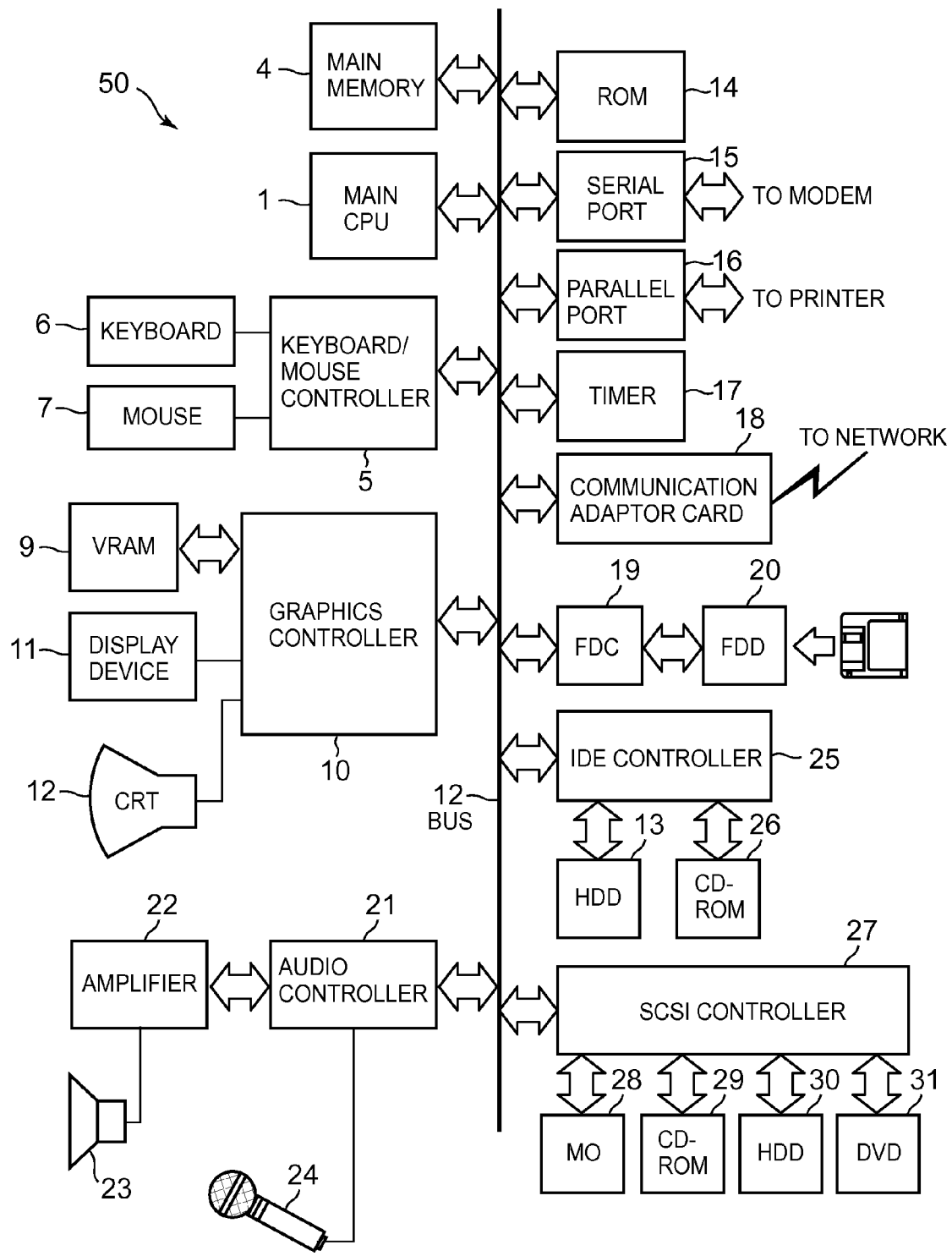
FIG. 7 shows an example of a hardware configuration of a computer 50 according to an embodiment of the present invention.

FIG. 7 is a view showing an example of a hardware configuration of a computer 50 according to the present embodiment. The computer 50 includes a main CPU (central processing unit) 1 and a main memory 4 that are connected to a bus 2. Moreover, removable storages (external storage systems capable of replacing recording media) such as hard disk drives 13 and 30, CD-ROM drives 26 and 29, a flexible disk drive 20, a MO drive 28, and a DVD drive 31 are connected to the bus 2 through a flexible disk controller 19, an IDE controller 25, a SCSI controller 27, and the like.

Storage media such as a flexible disk, a MO disc, a CD-ROM disc, a DVD-ROM disc are inserted into the removable storages. The codes of a computer program for instructing a CPU or the like in collaboration with an operating system to implement the present invention can be recorded in these storage media, the hard disk drives 13 and 30, and the ROM 14. That is, a byte code execution program which is installed in the computer 50 to cause the computer 50 to function as command execution devices 200, 800, or 1100 can be recorded in the storage devices described above.

A selection program causing the computer 50 to function as the selection device 200 includes a probability calculation module, a combination determination module, a transmission requesting module, and a deleting module. These modules collaborate with the CPU 1 or the like to cause the computer 50 to function as the probability calculation unit 202, the combination determination unit 204, the image storage unit 206, the transmission requesting unit 208, and the deleting unit 210, respectively. The computer program can be recorded in a plurality of media by being compressed and divided into a plurality of programs.

The computer 50 receives inputs from an input device such as a keyboard 6 and a mouse 7 through a keyboard/mouse controller 5. The computer 50 receives inputs from a microphone 24 and outputs sound from a speaker 23 through an audio controller 21. The computer 50 is connected to a display device 11 for presenting visual data to a user through a graphics controller 10. The computer 50 can communicate with other computers or the like by connecting to a network through a network adapter 18 (an Ethernet (registered trademark) card or a token ring card) or the like.

From the above description, it can be easily understood that the computer 50 according to the present embodiment is realized by an information processing device such as a general personal computer, a workstation, or a mainframe, or a combination thereof. The components described above are given for illustrative purposes only, and not all of them are essential components of the present invention.

While the present invention has been described by way of embodiments, the technical scope of the present invention is not limited to the scope described in the embodiments. It will be obvious to those skilled the art that various modifications and improvements can be made to the embodiments described above. Therefore, such modified or improved embodiments are also within the technical scope of the present invention.

What is claimed is:

1. A computer-implemented method in a provisioning system including a first pool having the images of a plurality of different operating systems (OS) and a second pool having a plurality of data processing systems, for selecting one or more OS images to be cached in a target data processing system, wherein the target data processing system is one of a plurality of data processing systems from the plurality of OS images in the first pool, the method causing a computer to execute the steps comprising:

calculating the probability that the respective OS images in the first pool will be used in the next provisioning, wherein calculating the probability comprises obtaining the probability with respect to the respective OS images in the first pool by calculating the number of resources that are created using the OS image and currently running in any one of the data processing systems in the second pool; and determining, among all combinations of one or more OS images that can be selected from the plurality of OS images in the first pool to be cached in the target data processing system, a combination of one or more OS images as one or more OS images to be cached, which minimizes an expected value of the time needed for transmitting OS images to the target data processing system in the next provisioning, obtained assuming the caching.

2. The method according to claim 1, wherein the determining step includes:

calculating the pattern of $x_i$ maximizing the sum of $p_i$*$S_i$*$x_i$ with respect to all OS images in the first pool under the condition that the total size of one or more OS images to be cached does not exceed a cache size of the target data processing system, wherein the size of the i-th OS image in the first pool is $S_i$, the number of resources that are created using the OS image and currently running is $p_i$, and a two-valued variable indicating the cache state in the target data processing system, of the OS image is $x_i$; and determining a combination of one or more OS images minimizing the expected value of the transmission time based on the calculated $x_i$ pattern.

3. The method according to claim 2, wherein the pattern of $x_i$ maximizing the sum of $p_i$*$S_i$*$x_i$ with respect to all OS images in the first pool is calculated using an approximation algorithm for the 0-1 knapsack problem.

4. The method according to claim 3, further comprising:

calculating, in response to a request to transmit OS images in the first pool in the target data processing system during the provisioning, the number of resources that are created using any one of the remaining OS images excluding an OS image being used in the target data processing system from one or more OS images cached in the target data processing system, and currently running in any one of the data processing systems in the second pool;

determining a new combination of one or more OS images minimizing the expected value of the time needed for transmitting OS images to the target data processing system using a value obtained by subtracting the total size of the OS image being used and the OS images that are newly transmitted from the cache size as a new cache size; and deleting OS images that are not included in the newly determined combination among the remaining OS images from the target data processing system.

5. The method according to claim 3, wherein the resource is a virtual machine that is provided by a hypervisor on any one of the data processing systems in the second pool using any one of the OS images in the first pool.

6. The method according to claim 3, wherein the first pool further includes one or more differential images associated with the respective OS images, that are obtained by subtracting the OS image from a customized OS image created based on the OS image and wherein the combination of one or more OS images in the first pool, resulting in the minimum expected value minimizes an expected value of the time needed for transmitting the OS image and a differential image associated with the OS image.

7. A selection device for selecting images of one or more operating systems (OS) that are cached in a target data processing system in a second pool, wherein the second pool includes a plurality of data processing systems from a first pool, and wherein the first pool includes the images of a plurality of different OS, the device comprising:

a memory;

a processor device communicatively coupled to the memory; and a host machine pool in a provisioning system coupled to the memory and the processor device, the host machine pool comprising the steps of a method comprising:

calculating the probability that the respective OS images in the first pool will be used in the next provisioning, wherein calculating the probability comprises obtaining the probability with respect to the respective OS images in the first pool by calculating the number of resources that are created using the OS image and currently running in any one of the data processing systems in the second pool; and determining, among all combinations of one or more OS images that can be selected from the first pool to be cached in the target data processing system, a combination of one or more OS images as one or more OS images to be cached in the target data processing system, which minimizes an expected value of the time needed for transmitting OS images to the target data processing system in the next provisioning, obtained assuming the caching of the combination of OS images.

8. A computer readable storage medium having program instructions embodied therewith, wherein the computer readable storage medium is not a transitory signal per se, the program instructions executable by a computer to cause the computer to perform a method in a provisioning system including;

a first pool having the images of a plurality of different operating systems (OS); and a second pool having a plurality of data processing systems for selecting one or more OS images to be cached in a target data processing system, wherein the target data processing system is one of a plurality of data processing systems from the plurality of OS images in the first pool, the method comprising:

calculating the probability that the respective OS images in the first pool will be used in the next provisioning, wherein calculating the probability comprises obtaining the probability with respect to the respective OS images in the first pool by calculating the number of resources that are created using the OS image and currently running in any one of the data processing systems in the second pool; and determining, among all combinations of one or more OS images that can be selected from the plurality of OS images in the first pool to be cached in the target data processing system, a combination of one or more OS images as one or more OS images to be cached, which minimizes an expected value of the time needed for transmitting OS images to the target data processing system in the next provisioning, obtained assuming the caching.

* * * * *